United States Patent Office 2,893,970
Patented July 7, 1959

2,893,970

MELT-SPUN POLYMERIC FIBERS CONTAINING PIGMENTS OF CROSS-LINKED POLYMERIZED UNSATURATED AMIDES AND MELT SPINNING COMPOSITION THEREFOR

John R. Caldwell, Russell Gilkey, and Clarence C. Dannelly, Kingsport, Tenn., assignors to Eastman Kodak Company, Rochester, N.Y., a corporation of New Jersey No Drawing. Application November 21, 1956
Serial No. 623,533

20 Claims. (Cl. 260—45.4)

This invention relates to polymeric pigments from unsaturated aliphatic amides for pigmenting synthetic fibers, films, molding compositions, etc. This invention particularly relates to an improved composition adapted for use in preparing readily dyeable synthetic organic fibers by the melt spinning process, which composition contains a highly polymeric fiber-forming constituent. The improvement particularly relates to the presence in such a melt spinning composition of from about 2% to about 40% (based on the weight of the fiber-forming constituent) of polymeric pigment particles having sizes of less than 10 microns comprising a cross-linked high molecular weight addition type polymer derived from a monoethylenically unsaturated aliphatic amide compound, the pigment particles being insoluble both in water and in the fiber-forming constituent at spinning temperatures, i.e. they are infusible under the conditions of use. This invention also relates to an improvement in the process of melt spinning readily dyeable synthetic fibers wherein the composition to be spun contains such a polymeric pigment.

The synthetic fibers with which an important embodiment of this invention is particularly concerned include those derived from any of the highly polymeric linear polyesters which include polyethylene terephthalate, poly-1,4-cyclohexylene-dimethylene terephthalate, and other linear highly polymeric polyesters which are capable of being formed into fibers by melt spinning procedures. Another embodiment of this invention is described hereinbelow which pertains to fibers derived from crystallizable polymers of α-monoolefinic hydrocarbons such as polyethylene, polypropylene, etc. Of course, there are significant differences between the application of this invention to polyesters and to hydrocarbon polymers although the procedural techniques happen to be analogous to a considerable degree.

The prior art described the employment of polymers derived from a monoethylenically unsaturated aliphatic amide compound which can be added to solutions of certain fiber-forming materials to impart special dyeing properties. When a fiber has been spun containing such an additive, the additive tends to separate out from the principal fiber-forming material and form its own phase since it is generally incompatible with the fiber-forming material.

It is also known that mixtures of two polymeric materials can usually be at least partially separated by the use of various organic solvents. Thus, some of the soluble and fusible amide composition which may be present in the known fibers may be entirely lost, while some remains on the surface and forms a sticky layer that causes "plastering" of the filaments. Such objectionable situations may develop during the treatment of fibers, yarns, or fabrics while they are being processed for ultimate use by the final consumer.

In addition, it is known that polymers of one monomeric material can be formed in the presence of a preformed polymeric material such as in the preparation of polyester-amides; however, the polymers produced are substantially different from polyesters in various physical as well as chemical properties.

Moreover, it is known that the dyeability of polyester fibers can be enhanced by applying to the fibers an amide or amine-containing composition. However, the treated fibers do not dye as well nor as uniformly as by practicing the invention described herein whereby greatly improved results are achieved.

Furthermore, it is known that certain insoluble colored pigments can be incorporated into melt spinning compositions which are colored by such pigments.

In general, the commercially practicable polyester fibers have been dyed at pressures greater than atmospheric or in the presence of dyeing assistants in order to obtain practical shades. Thus, dyeing polyester fibers with most acid wool dyes, direct cotton dyes, vat dyes or premetallized dyes has been impractical.

We have now found that polyester fibers of greatly improved dyeability can be produced by incorporating a certain class of polymeric pigments into the polyester composition which is to be melt spun so as to form a synthetic organic polyester fiber. These polymeric pigments of this invention are characterized by three essential physical properties: (1) They are discrete particles having diameters less than 10 microns and preferably less than 2 microns, (2) they are infusible at temperatures used in melt spinning polyesters (about 150° C. up to about 300° C.), and (3) they are insoluble at such temperatures in the polyesters with which they are mixed during melt spinning. These polymeric pigments do not separate as a distinct phase from the fiber-forming constituent of the fiber into which they have been incorporated since they are physically distributed in a uniform manner throughout the structure of the fiber and hence cannot flow together and separate out as a liquid or gel phase. Because of their insolubility in water and the fiber-forming polyester, they obviously retain their discrete form within the structure of the fiber. The polymeric pigments of the present invention retain their particulate structure at all times and hence cannot diffuse through the fiber and migrate to the surface.

It is an object of this invention to provide synthetic polyester fibers which are characterized by excellent dyeability to practical shades without using super-atmospheric pressure or dyeing assistants employing cellulose acetate dyes, acid wool dyes, etc.

It is a further object of this invention to provide synthetic polyester fibers which contain a dye receptive pigment which is mechanically distributed in a uniform manner throughout the fiber and is not subject to phase separation or "plastering" difficulties when two or more filaments come into mutual contact.

It is a further object of this invention to provide such synthetic polyester fibers which possess the valuable characteristics of the principal fiber-forming constituent (melting point, tensile strength, elongation, elastic recovery, processability, etc.) while at the same time having improved dyeability, freedom from phase separation, "plastering" and other related difficulties associated with the production of fibers containing constituents designed to enhance their dyeability.

Another object of this invention is to provide polymeric pigments comprising particles of less than 10 microns in size prepared from a polymer comprising a cross-linked polymerized monoethylenically unsaturated aliphatic amide compound, which addition type polymer is insoluble both in water and in common organic solvents and is infusible and insoluble in polyesters at melt spinning temperatures.

It is an additional object of this invention to provide a composition for the melt spinning of synthetic polyester fibers which contains uniformity distributed therethrough a polymeric pigment of the type described above.

An additional object of this invention is to provide a process for pigmenting synthetic polyester fibers to enhance their dyeability (but without deleteriously affecting their desirable physical and chemical properties) by melt spinning a composition containing a polymeric pigment of the type described herein.

Another object of this invention is to provide compositions for employment in the melt spinning of synthetic polyester fibers which contain a polymeric pigment having the characteristics described.

Other objects will become apparent elsewhere herein, especially those objects which pertain in an analogous manner to crystallizable polymers of α-mono-olefinic hydrocarbons such as polyethylene and the like.

POLYESTERS

In accordance with a principal embodiment of this invention there is provided a spinning composition adapted for use in preparing readily dyeable synthetic polyester fibers by the melt spinning process, which composition comprises a fiber-forming constituent and from about 2% to about 40% (based on the weight of the fiber-forming constituent) of a polymeric pigment having a particle size of less than 10 microns comprising a high polymer derived from a cross-linked monoethylenically unsaturated aliphatic amide compound, the pigment being insoluble both in water and in said fiber-forming constituent and being infusible at melt spinning temperature and being substantially uniformly distributed throughout the spinning composition.

The fiber-forming constituents with which this aspect of the invention is particularly concerned include any of the well-known highly polymeric linear polyesters employed in the preparation of synthetic organic fibers by melt spinning methods. Thus, this invention applies to those fibers which are now well known in the art and which can be employed in the preparation of yarns, threads, woven fabrics, unwoven fabrics, various textile materials, ropes, etc. and which are characterized by melting points of at least 150° C. and generally 200° C. or higher as well as numerous other chemical and physical characteristics well known to those acquainted with the art of manufacturing synthetic organic fibers and products produced therefrom. Examples of linear polyester materials which can be advantageously employed in the preparation of synthetic organic fibers include the polyesters derived by the condensation of one or more of the following acids or esters thereof with one or more of the indicated glycols:

(1) Terephthalic acid with ethylene glycol,
(2) p,p'-Sulfonyldibenzoic acid with pentamethylene glycol,
(3) Terephthalic acid with 1,4-cyclohexanedimethanol,
(4) 4,4'-ethylenedioxydibenzoic acid or its esters with tetramethylene glycol,
(5) 4,4'-ethylenedibenzoic acid with 2,2-dimethyl-1,3-propanediol,
(6) Terephthalic acid and glutaric acid with 1,4-cyclohexane-dimethanol,
(7) 4,4'-diphenic acid with ethylene glycol,
(8) Dimethylmalonic acid with 2,2-dimethyl-1,3-propanediol,
(9) Terephthalic acid with tetramethylene glycol and neopentyl glycol,
(10) p,p'-Sulfonyldibenzoic acid and sebacic acid with hexamethylene glycol, etc.

Most advantageously, the polyesters employed in accordance with this invention are composed solely of carbon, hydrogen and oxygen since these polyesters generally produce fibers having the best physical and chemical properties. Thus, this invention enables the most desirable polyesters to be formed into fibers with excellent dyeability and without substantial diminution of those properties for which such polyesters are most highly valued.

Many patents have been issued which describe the preparation of synthetic polyester fibers by the melt spinning technique and these patents present a wealth of information as to the nature of these fiber-forming materials, how they can be prepared, their physical and chemical characteristics, the details of how melt spinning compositions are prepared containing these fiber-forming materials, numerous additives which can be incorporated therein, the conditions under which such compositions can be spun to form fibers, the apparatus and method of operating the apparatus used in forming such fibers, the twisting of yarns, making of threads, weaving of textiles, the preparation of unwoven fabrics, manufacture of ropes, etc. Similar information in the prior art pertains to the hydrocarbon polymers. It is obvious that there is nothing to be gained by reviewing or discussing all of the ramifications so thoroughly explained and considered in the previously issued patents and publications readily available in the literature and with which those skilled in the art are quite familiar.

To those acquainted with the art of the melt spinning of fiber-forming materials it will be apparent that the essence of this invention resides in several features, the most significant of which is the provision of a polymeric pigment which can be incorporated into the melt spinning composition (polyester or hydrocarbon polymer) and which has the physical and chemical characteristics described herein and which contributes certain valuable physical and chemical characteristics to the fiber produced as described herein. Moreover, this invention can also be applied to the preparation of improved films by obvious analogy.

Advantageously, the polymeric pigments of this invention are made up of at least 30% by weight thereof (preferably 50% to 100%) of a cross-linked highly polymeric addition type polymer derived from a mono-ethylenically unsaturated aliphatic amide compound. This particular class of polymers contributes the principal dye receptive characteristic to the polymeric pigment. In some instances there are reasons which make it advantageous to prepare polymeric pigments from high polymers which contain up to 70% of other polymerized unsaturated compounds. These other compounds can be any of those which are capable of forming a copolymer with the monoethylenically unsaturated aliphatic amide and which contribute some desirable physical or chemical characteristic.

The high polymers of a monoethylenically unsaturated aliphatic amide compound generally do not possess the qualities of being infusible and insoluble both in water and in the polyester employed in forming the fibers. Therefore, it is essential that a third constituent be present in the polymeric pigment polymer which serves as a cross-linking agent resulting in the formation of a polymeric pigment which is infusible and insoluble both in water and in the polyester during melt spinning. Since these characteristics are essential features of the polymeric pigments of this invention, this invention contemplates the presence of from about 1% up to about 20% of a cross-linking agent in the composition of the polymeric pigment. More than 20% can be employed in some instances. It is generally not desirable to use less than 1%, however, less than 1% can be employed under some circumstances, e.g. in the case of a polyester melting at 150° C. Most advantageously, there is employed from about 5% to about 20% of a cross-linking agent.

The nature of cross-linking agents for polymers and copolymers of monoethylenically unsaturated amide compounds is already known in the art pertaining to addition-type vinyl polymers of this general class and needs no elaboration herein. Suitable examples of cross-linking agents which can be employed include those doubly ethylenically unsaturated organic compounds including divinyl benzene, diallyl terephthalate, allyl acrylate, methylene bisacrylamide, etc. A useful group of such cross-linking agents includes divinyl and diallyl organic compounds containing from 5 to 20 carbon atoms, examples of which have just been set forth. Such cross linking agents can be employed in amounts of from about 0.1% to about 20% by weight.

The monoethylenically unsaturated aliphatic amide compounds which can be employed in the preparation of the polymeric pigments of this invention include the maleic amides, fumaric amides, itaconic amides, citraconic amides and acrylamides wherein the amino groups of all of these amides have the formula —$NR_2$ and the $\alpha$-position of acrylamide contains an R substituent wherein each R represents a member selected from the group consisting of lower alkyl and hydroxyalkyl radicals containing from 1 to 6 carbon atoms and a hydrogen atom.

Examples of these compounds include acrylamide, $\alpha$-methacrylamide, N-methyl - $\alpha$-methacrylamide, N - isopropylacrylamide, N,N - dimethylacrylamide, N - (2-hydroxyethyl) - acrylamide, N - butyl-$\alpha$-methacrylamide, N,N,N',N'-tetramethylmaleamide, fumaric amide, N,N'-diethylitaconic diamide, the corresponding amides and also the ester-amides of maleic, fumaric, itaconic and citraconic acids, and numerous other equivalent amides, ester amides and N-substituted derivatives thereof such as will be apparent to those skilled in the art. The alkyl radicals for the alcoholic portion of the ester-amides of the dibasic acid amides can be advantageously derived from those alkyl radicals containing from 1 to 6 carbon atoms.

The methods for polymerizing such amide compounds so as to prepare polymers or copolymers thereof with other monoethylenically unsaturated compounds as well as the methods for cross-linking such polymers and copolymers are well illustrated in the prior art with which this invention is not directly concerned but which is further illustrated in several of the working examples presented hereinbelow. Thus, in the preferred embodiment of this invention the polymerization of such cross-linked polymers or copolymers is carried out in accordance with a solution-polymerization technique such as that technique involving the employment of a redox catalyst system. The known solution-polymerization procedures can generally be adapted to produce a polymeric product which is finely divided and which can be separated from the medium of polymerization as finely divided particles having diameters of no more than 10 microns and generally considerably less than 5 microns; preferably less than 2 microns. In some instances, the pigment polymer can be ground in a comminuting mill of conventional design in order to produce a sufficiently small particle size. It is sometimes advantageous to perform such grinding in the presence of water or an organic liquid which can be used in the preparation of the melt spinning composition into which the pigment is to be introduced. The pigment can be ground to diameters as little as 1 micron or less, which particles will be uniformly distributed throughout the liquid medium and will consequently become more quickly and advantageously distributed throughout the melt spinning composition in a uniform manner.

When the polymeric pigment polymer or copolymer is formed in an aqueous medium, it is advantageous to carry out the polymerization in the presence of a surface-active agent or a protective colloid in order to obtain the desired particle size employing techniques well known in the art. The aqueous suspension of the polymeric pigment material can then be dried and ground in a suitable mill or it can be dried by spraying the suspension of polymer into a heated chamber with an atomizer nozzle (under circumstances which permit the suspending medium to be evaporated) and separating the dried powder of the polymeric material for use as the polymeric pigment. Generally such spray-drying techniques can be readily developed so as to produce a polymeric pigment of the desired size although further grinding can be performed if required.

A polymeric pigment can be prepared by polymerizing a monoethylenically unsaturated aliphatic amide compound in a solution in acetone containing from about 1% to about 5% of a cellulose ester employing a peroxy type polymerization catalyst at an elevated temperature whereby a suspension of polymeric pigment particles having a diameter of well under 10 microns is produced in the presence of the dissolved cellulose ester which functions as a protective colloid and maintains the finely divided polymeric pigment in uniform suspension. This suspension of the pigment can be filtered with essentially no loss of the pigment formed and this suspension of the polymeric pigment in acetone can be advantageously blended with granulated particles of polyester from which the acetone is then evaporated so as to produce a melt spinning composition from which the pigmented polyester fibers can be formed in a highly advantageous manner. In practicing this exemplary embodiment of the invention, the acetone employed for forming the polymeric pigment can be replaced altogether or in part with other organic liquids capable of evaporation at reasonable temperatures (e.g. less than 150° C.). It is generally advantageous in this exemplary embodiment to form a polymeric pigment which is made up of cross-linked polymers and copolymers consisting solely of one or more of the monoethylenically unsaturated aliphatic amide compounds. Polyethylene terephthalate fibers containing from 10 to 25% of such pigments can be dyed quite successfully with acid wool dyes, cellulose acetate dyes, and other dyes known in the art.

The amount of pigment generally useful according to this invention varies over a wide range, e.g. 2% to 30% based upon the weight of the pigmented fiber or film; of course, larger or smaller quantities can also be employed as may be desired, however from 10% to 25% constitutes a generally advantageous range.

As is apparent from the description of the invention, the use of the polymeric pigments provided herein opens an entirely new field in the preparation of hydrocarbon polymer fibers and polyester fibers and films by the melt spinning process since any worthwhile quantity (e.g. 2% to 30%) of the amide polymer pigment can be used in the melt spinning composition which is formed into oriented fibers and films.

When the polymer for use as the polymeric pigment is made in water, catalysts which can be advantageously employed include potassium persulfate, ammonium persulfate, hydrogen peroxide, sodium perborate and numerous other peroxy catalysts. The employment of a redox catalyst system can be advantageously employed under these circumstances. It is also advantageous to employ surface-active agents or protective colloids in order to control the particle size and facilitate the preparation of polymeric material of suitable particle size for use as the polymeric pigment.

When the polymer for use as the polymeric pigment is made in an organic solvent, suitable catalysts include benzoyl peroxide, acetyl peroxide, cumene hydroperoxide, azo-bis-isobutyronitrile, etc. as well as numerous other peroxy-type catalysts.

Protective colloids which can be advantageously employed to control the particle size include polymeric materials that are soluble in the organic solvent. Such materials serve as protective colloids during the polymerization of the monoethylenically unsaturated aliphatic amide. The resulting dispersion in the organic solvent can then be advantageously mixed with the granulated polyester and the liquid evaporated so as to leave a uniformly blended mixture of the polymeric pigment particles on the surface of the much larger polyester particles.

According to a preferred embodiment of this invention the melt spinning composition comprises particles of the polymeric pigment of less than 5 microns in diameter intimately blended with particles of the polyester of from about 0.001 to about 0.25 inch in diameter so that a major amount of the polymeric pigment particles are adhered to the surfaces of the polyester particles. This can be advantageously accomplished by mixing the polyester particles with a suspension of the pigment particles in a liquid medium and evaporating the liquid. This mixing can be done by stirring the components in a vessel or by spraying a suspension of the pigment particles upon an agitated mass of the polyester particles, or by other means. Of course, the particles can also be blended in the dry state but with generally less advantageous results.

Excellent results can also be obtained by introducing the pulverized dry polymeric pigment into a molten polyester and thoroughly mixing the composition so as to form a uniform dispersion of the infusible pigment in the molten polyester. This latter technique can advantageously be performed during the melt-polymerization process of making the polyester especially since mixing is a common operation in preparing such polyesters. Similarly, mixing can be accomplished during the final stages of the solid phase polymerization of polyesters (powder build-up process). Alternatively, a previously prepared polyester can be melted and mixed with the pigment in a suitable vessel. The blended composition can be immediately extruded or it can be allowed to solidify, be granulated and then later be melt spun in the usual manner.

The present invention particularly contemplates dyeing the synthetic polyester fiber after it has been spun; however, the polymeric pigments of this invention can also be previously dyed although the results obtained are difficult to control.

The general principles which are involved in practicing this invention as well as the details involved are believed apparent from the above discussion when considered in the light of the examples which are presented hereinbelow. In addition, reference is made to the various patents in the prior art which describe the employment of pigments in printing inks, lacquers, enamels, paints, polyesters, alkyd resins, drying oils, molding plastics, rubber, fibers, sheets, wrapping materials, etc. Art of this type gives numerous illustrations of the dyestuffs which can be employed in forming colored pigments and illustrates that such pigments can either be dyed before they are introduced into the material being pigmented or they can be dyed afterward. Exemplary art which may be of some value in illustrating various aspects of some matters pertaining to the present invention include U.S. 2,265,127, U.S. 2,534,136, U.S. 2,688,008, British 651,694, et cetera.

This invention can be further illustrated by the following examples of preferred embodiments although it will be understood that these examples are included merely for purposes of illustration and are not intended to limit the scope of the invention unless otherwise indicated.

*Example 1*

A mixture of 30 g. of N,N-dimethylacrylamide and 3 g. of methylene-bisacrylamide was dissolved in 200 ml. of acetone. After addition of 3 g. of acetyl peroxide as catalyst, the reaction mixture was stirred rapidly at reflux for 7 hours. A white suspension of the cross-linked polymer was obtained. The particle size of the polymer was such that the suspension had not settled out after standing for several days.

A polyester having the composition 5.0 moles 4,4'-sulfonyldibenzoic acid+1.0 mole succinic acid+6.0 moles pentamethylene glycol was prepared by solid phase build-up of the powdered prepolymer. This polymer had a particle size of less than 0.01 inch and an inherent viscosity, as measured in 60 phenol-40 tetrachloroethane, of 0.98. A mixture of 270 g. of the polyester and 30 g. of the cross-linked vinyl polymer was slurried in 300 ml. of acetone. The acetone was evaporated by the heat from an infrared lamp with constant stirring of the mixture. The product was further dried by heating at 70° C. in a vacuum oven for 4 hours.

The coated polyester was extruded through a multi-hole spinneret to give fibers. The fibers spun normally and could readily be heat set and drafted. Physical properties of the polyester fiber such as tensile strength, elongation, sticking temperature, etc., were not impaired. However, the moisture regain and dyeability of the fibers were markedly increased. They dyed well with cellulose acetate, acid wool, and premetallized dyes.

*Example 2*

A vinyl terpolymer having the composition 54 parts N - isopropylacrylamide+36 parts N - tert - butylacrylamide+10 parts methylenebisacrylamide was prepared using the method described in Example 1.

A granular polyethylene terephthalate (255 g.) with an average particle size of 0.1 inch was sprayed with an acetone suspension of the above vinyl terpolymer containing 45 g. of polymer. The acetone was flashed off and the coated polyester was extruded into film and fibers. The fibers dyed to deep shades at the boil with cellulose acetate, acid wool, and some direct cotton and vat dyes. Unmodified polyethylene terephthalate fibers can be dyed with cellulose acetate dyes to deep shades only when superatmospheric pressure is used or with swelling agents in the dye bath.

*Example 3*

A water suspension of a cross-linked vinyl terpolymer was prepared according to the following recipe:

200 g. N,N-dimethylacrylamide
50 g. acrylonitrile
50 g. divinylbenzene
2000 g. water
2 g. $Na_2S_2O_5$
2 g. $K_2S_2O_8$
2 g. Emulphor ON–870—a group of non-ionic water-soluble polyethylene ethers of fatty acids or alcohols.
4 g. Tergitol No. 4—sodium alkyl sulfate, e. g.

$C_4H_9CH(C_2H_5)C_2H_4CH(SO_4Na)CH_2CH(CH_3)_2$ 0.1 ml. acetic acid

A mixture of the above ingredients was agitated vigorously at 60° C. for 4 hours. The resulting suspension was stable indefinitely. The polymer could be isolated by drying and could then be resuspended in water, acetone, or other volatile solvent. Alternatively, the powdered polymer could be isolated by a spray drying technique.

An intimate mixture of 276 g. of powdered polyethylene terephthalate and 24 g. of the above cross-linked vinyl terpolymer in a powdered form was melt spun. The physical properties of the fibers were not affected by the presence of the modifying organic pigment. However, the fibers dyed heavily with cellulose acetate and premetalized dyes. The problem of static electrification in the processing of the fibers was also eliminated due to the much higher moisture regain of the modified polyester.

*Example 4*

The cross-linked vinyl terpolymer described in Example 3 was mixed with a polyester having the composition 4.0 moles terephthalic acid+1.0 mole succinic acid+5 moles 1,4-cyclohexanedimethanol. A water suspension of the vinyl terpolymer and pulverized polyester were used. The amount of suspension was adjusted to give 10 parts of vinyl terpolymer for 100 parts of polyester. The water was evaporated in a vacuum oven at 90° C.

The coated polyester was extruded through a multi-hole spinneret to give fibers. They dyed well with cellulose acetate, acid wool, premetallized, direct cotton, and some vat dyes. The dyed fibers had excellent wash and light fastness.

Example 5

The cross-linked vinyl terpolymer described in Example 3 was isolated as a powder by spray drying. It was stirred into a melt of polyester prepared from 4,4'-ethylenedioxy dibenzoic acid and 1,4-cyclohexanedimethanol. The amounts were chosen so that the product contained 15% of the vinyl modifier. The melt was stirred for 5 minutes in an atmosphere of purified nitrogen. It was then extruded in the form of rods which were subsequently pelleted. Fibers were spun from this product. They dyed well with cellulose acetate, acid wool, and direct cotton dyes.

Example 6

A vinyl terpolymer having the composition 70 parts N-isopropylacrylamide+15 parts 2-methyl-5-vinyl pyridine+15 parts methylenebisacrylamide was prepared.

An acetone suspension of this polymer was sprayed on a polyester having the composition 0.85 mole 4,4'-diphenic acid+0.15 mole succinic acid+1.0 mole tetramethylene glycol. The mixture contained 85% polyester and 15% of the cross-linked vinyl terpolymer. Fibers spun from the mixture dyed well with cellulose acetate, acid wool, and premetallized dyes.

Example 7

The following materials were placed in a flask:

14.0 g. methyl acrylate
7.0 g. methacrylamide
1.5 g. diallyl phthalate
0.5 g. sodium dodecyl sulfate
0.2 g. potassium persulfate
200.0 g. water The mixture was stirred at 50° C. for 16 hours. A stable emulsion was obtained. The product was precipitated by adding sodium sulfate and washed with water. It was then washed with acetone until essentially free of water. The product, while still wet with acetone, was placed in a ball mill and ground for 6 hours to give a fine suspension of the polyamide pigment in acetone having particle sizes of less than 1 micron. A part of this suspension, containing 10 g. of the amide pigment, was mixed with 80 g. of the unmodified polyester described in copending application Ser. No. 554,639, filed December 22, 1955, by Kibler et al. The polyester of terephthalic acid and 1,4-cyclohexanedimethanol had particle sizes of about 0.1–0.2 inch. The acetone was evaporated from the mixture which was then melt spun to form fibers which dyed well with acid wool dyes and cellulose acetate dyes.

Example 8

In the same manner as in Example 7, 15% of the pigment described in Example 7 was incorporated with a polyester of 85 mole percent terephthalic acid plus 15 mole percent glutaric acid condensed with 1,4-cyclohexanedimethanol (see Kibler et al., Ser. No. 554,639 cited above).

Fibers spun from the composition dyed well with acid wool dyes, cellulose acetate dyes, direct cotton dyes and vat dyes.

Example 9

The following materials were placed in a flask:

50.0 g. N-tert-butylacrylamide
50.0 g. N-isopropylacrylamide
5.0 g. divinylbenzene
3.0 g. sodium dodecyl sulfate
1.0 g. potassium persulfate
900.0 g. water.

The mixture was stirred vigorously at 80–90° C. for 6 hours. A stable emulsion was produced. The emulsion was spray-dried by spraying it into a heated chamber with an atomizer nozzle. The fine powder was collected and ball milled with dimethylformamide until a smooth, stable suspension was obtained. The pigment dispersion was mixed with a granulated polyester of p,p'-sulfonyl-dibenzoic acid condensed with pentamethylene glycol to form a composition containing 20% pigment, based on the weight of the polyester. The dimethylformamide was evaporated. Fibers spun from the composition dyed well with acid wool and cellulose acetate dyes.

Example 10

85 g. of N-isopropylacrylamide, 9 g. of 2-methyl-5-vinylpyridine, and 6 g. of divinylbenzene were dissolved in 400 g. of acetonitrile, and 1.0 g. of azo-bis-isobutyronitrile was added as catalyst. The mixture was stirred at 70–75° C. for 10 hours. There was no apparent change except for a slight haze, but analysis showed that the reaction had gone to about 85% completion and a suspension of the cross-linked polymer in acetonitrile was formed. The suspension was filtered through paper and showed no substantial change in composition. The particles of cross-linked resin were small enough to pass through the paper. Part of the suspension was mxed with granulated polyethylene terephthalate to give 15% pigment, based on the polyester, and the acetonitrile was evaporated. Fibers spun from the mixture dyed well with acid wool and cellulose acetate dyes.

Example 11

25 g. N-isopropylacrylamide, 5 g. 2-methyl-5-vinylpyridine, 2 g. divinylbenzene, 3 cc. acetic acid, 0.4 g. azo-bis-isobutyronitrile, and 65 cc. of tert-butyl alcohol were stirred and heated at 50° C. for 24 hours. The cross-linked amide polymer separated out as a fine powder. The powder was washed with acetone and then ball milled with acetone to give a fine suspension. The suspension of pigment in acetone was mxed with granulated polyethylene terephthalate. The acetone was evaporated and fibers were melt spun. Yarn containing 10–15% of the pigment dyed well with acid wool and cellulose acetate dyes.

Example 12

10 g. of cellulose acetate was dissolved in 200 cc. of acetone and the following materials were added:

20.0 g. N-methyl methacrylamide
20.0 g. methacrylamide
2.0 g. allyl acrylate
1.0 g. benzoyl peroxide The solution was stirred at 50–55° C. for 18 hours. The polyamide pigment was formed as particles having a diameter of 3 microns or less. The dissolved cellulose acetate functioned as a protective colloid and held the finely divided pigment in suspension. The suspension could be filtered with essentially no loss of pigment. The suspension was mixed with granulated polyethylene terephthalate and the acetone was evaporated. Fibers were then melt spun. Yarn containing 10–20% of the pigment dyed well with acid wool dyes and cellulose acetate dyes.

Example 13

10 g. of polyacrylonitrile was dissolved in 200 g. of dimethylformamide and the following materials were added:

50.0 g. acrylamide
3.0 g. methylene-bis-acrylamide
1.0 g. benzoyl peroxide

The solution was stirred at 70–80° C. for 15 hours. A fine suspension of cross-linked polyacrylamide was formed. The suspension was mixed with granulated polyethylene terephthalate and the dimethylformamide was evaporated. Fibers made from the composition and containing 15–20% of the pigment dyed well with cellulose acetate dyes, some acid wool dyes, and some vat dyes.

*Example 14*

The following materials were placed in a flask:

60.0 g. vinyl acetate
40.0 g. fumaric amide
5.0 g. diallyl phthalate
4.0 g. sodium octadecyl sulfate
1.0 g. potassium persulfate
1000.0 g. water The mixture was stirred at 60° C. for 20 hours to give a stable emulsion. The emulsion was sprayed into a heated air chamber through a fine nozzle and the pigment was collected as a powder. A part of the powdered pigment was introduced into the melt during the final three minutes of the preparation of polyethylene terephthalate by the usual procedure of melt polymerization except that the vacuum was released. Fibers containing 10–20% of the pigment dyed well with acid wool dyes and cellulose acetate dyes. Another part of the powdered pigment was introduced during the last three minutes of the usual procedure for the solid phase polymerization of polyethylene terephthalate at atmospheric pressure under a nitrogen atmosphere. The pigment particles blended very well with the polyester particles and the fibers produced from this composition were essentially the same as just described.

*Example 15*

A cross-linked vinyl terpolymer was prepared from 60 parts N,N-dimethylacrylamide, 25 parts methyl methacrylate, and 15 parts divinylbenzene by the method outlined in Example 3. The water was evaporated and the product was dried in an oven at 100° C. It was then ground to a particle size of 0.1 inch. This polymer can readily be resuspended in water or organic solvents to give a stable suspension containing particles less than five microns in diameter. A suspension of one part of this terpolymer in two parts gamma-butyrolacetone was prepared by stirring the polymer in chilled gamma-butyrolactone.

A polyester of 75 mole percent terephthalic acid plus 25 mole percent glutaric acid condensed with 1,4-cyclohexanedimethanol (see Kibler et al. Ser. No. 554,639 cited in Example 7) was dissolved in gamma-butyrolactone at 190° C. A ratio of four parts solvent to one part polyester was used and an atmosphere of nitrogen was maintained over the mixture. The gamma-butyrolactone suspension of the cross-linked vinyl terpolymer prepared above was added to the hot polyester solution with stirring. The mixture was then allowed to cool. Equal weights of the vinyl terpolymer and polyester were used. The polyester crystallized out of the gamma-butyrolactone on cooling and carried the vinyl terpolymer with it by entrainment. The gamma-butyrolactone was removed from the product by washing with water. The product was dried in a vacuum oven at 70° C. Thirty percent of this product was incorporated with a polyester of 85 mole percent terephthalic acid plus 15 mole percent glutaric acid condensed with 1,4-cyclohexanedimethanol. Fibers spun from the composition dyed well with acid wool dyes, cellulose acetate dyes, and premetallized dyes.

HYDROCARBON POLYMERS

Although one principal embodiment of this invention relates to improvements in products and processes employing polyesters as described above, another principal embodiment of this invention contemplates the analogous formation of similarly valuable fibers from styrene, ethylene, propylene, butylene and other related mono-olefinic hydrocarbons. Fibers from these hydrocarbon polymers such as polyethylene and polypropylene fibers can be advantageously formed by the melt-spinning techniques described hereinabove for polyesters.

The polymerized hydrocarbon fibers which are contemplated according to this additional embodiment of the present invention include polyethylene, polypropylene, polybutylene, etc. as well as polystyrene which have been shown to produce crystalline hydrocarbon fibers by melt-spinning techniques. Also contemplated within this group of crystalline hydrocarbon fibers are fibers derived from isomers and homologs of those hydrocarbon fiber-forming compounds already named. These crystalline hydrocarbon polymers can be prepared by various methods, for example, polymerization of an α-mono-olefinic hydrocarbon with a metal containing catalyst such as the aluminum alkyls, molybdenum, chromium or vanadium oxides or similar metal containing catalysts with or without an activator such as a titanium compound, sodium compound or the like.

The practice of this embodiment of the invention is essentially the same as that already described and illustrated above in regard to polyesters and that description should be referred to for a discussion of the details involved in the preparation of the pigments, their incorporation into the polymers and the production of fibers or film.

This aspect of the invention can be further illustrated by the following examples of preferred embodiments although it will be understood that these examples are included merely for purposes of illustration and are not intended to limit the scope of the invention unless otherwise indicated.

*Example 16*

The following materials were placed in a reaction vessel:

1200 g. N,N-dimethylacrylamide
400 g. methyl methacrylate
160 g. divinylbenzene
40 g. a fatty alcohol sulfate (called Duponol ME, sold by Du Pont)
28 g. a polyoxyethylated fatty alcohol (called Emulphor ON–870, sold by General Dyestuff Corp.)
8 g. potassium persulfate
3 g. sodium bisulfite
4 gal. water.

The mixture was stirred rapidly at 50–60° C. for 8 hours to give a fine, stable suspension of polymer. The pigment was isolated as a fine powder by spray-drying.

This pigment has a strong affinity for practically all classes of dyes. It was mixed into spinning dopes and employed for spinning crystallizable polyethylene fibers and film. Moreover, this pigment can also be advantageously employed in preparing crystallized pigment-modified polymers from other polymerized hydrocarbons. In addition this pigment is useful in the production of cellulose acetate, cellulose triacetate, acrylonitrile polymer, and other types of fibers. The pigment also can be dyed in water suspension to give colored pigments.

*Example 17*

Using the general method described in Example 16, a pigment was made from the following materials:

1100 g. N,N-dimethylacrylamide
500 g. ethyl acrylate
160 g. divinylbenzene
40 g. Duponol ME (fatty alcohol sulfate) sold by Du Pont
28 g. Emulphor ON–870 (polyoxyethylated fatty alcohol) sold by General Dyestuff Corp.
8 g. potassium persulfate
3 g. sodium bisulfite
4 gal. water The product had excellent affinity for practically all classes of dyes.

Example 18

Twenty g. of the pigment described in Example 16 was stirred with 500 cc. of acetone to give a fine, stable suspension. One hundred g. of crystallizable polyethylene [made as described in Angew. Chem. 67, 541–547 (1955)], having a particle size passing through 200-mesh was slurried in the acetone-pigment suspension and the acetone was evaporated. The pigment was deposited on the surface of the polyethylene particles. Fibers were spun by extruding the melted polymer through a multi-hole spinneret. After drafting and heat-setting, the fibers had a tensile strength of 3.6 g. per denier and an elongation of 28%. They dyed readily with cellulose acetate, wool, and premetallized dyes.

Example 19

The pigment of Example 16 was incorporated in crystallizable polypropylene by a similar process. The fibers dyed well with cellulose acetate, acid wool, and premetallized dyes.

Example 20

Fifteen g. of the pigment described in Example 17 was milled with 100 g. of crystallizable polypropylene on heated rolls until a complete dispersion was obtained. Fibers were melt spun and drafted. They dyed well with cellulose acetate, wool, and premetallized dyes.

Example 21

Twenty g. of the pigment described in Example 16 was stirred with 500 cc. of acetone to give a fine dispersion. One hundred g. of crystallizable poly-4-methyl-pentene-1 was slurried in the acetone-pigment suspension and the acetone was evaporated. Fibers spun from the product by the melt method dyed well.

Example 22

Crystallizable polystyrene was used in place of polyethylene in Example 18 using the procedures described therein to obtain readily dyeable polystyrene fibers of excellent quality.

Example 23

Twenty g. of the pigment described in Example 16 was dispersed in 100 cc. of xylene. The dispersion was mixed with a solution of 100 g. crystallizable polyethylene in 300 cc. hot xylene. The mixture was allowed to cool and as the polyethylene separated from solution it carried the pigment down with it. The xylene was evaporated. The product was melt spun to give fibers with good dyeing properties.

Example 24

The following materials were placed in a reaction vessel:

900 g. N,N-dimethylacrylamide
700 g. styrene
160 g. divinylbenzene
40 g. Duponol ME (fatty alcohol sulfate) sold by Du Pont
28 g. Emulphor ON–870 (polyoxyethylated fatty alcohol) sold by General Dyestuff Corporation
8 g. potassium persulfate
3 g. sodium bisulfite
4 gal. water.

The mixture was stirred rapidly at 50–60° C. to give a fine, stable suspension of polymer. The pigment was dried to a fine powder by spray drying. The pigment has a strong affinity for practically all classes of dyes and was readily dispersible in crystallizable hydrocarbon polymers which were spun to form valuable fibers and film.

Example 25

Using the general methods described in Example 24, a pigment was made from the following materials:

900 g. N,N-dimethylacrylamide
700 g. 2-ethylhexyl methacrylate
160 g. 2,2-dimethylpropanediol diacrylate
40 g. Duponol ME (fatty alcohol sulfate) sold by Du Pont
28 g. Emulphor ON–870 (polyoxyethylated fatty alcohol) sold by General Dyestuff Corporation
8 g. potassium persulfate
3 g. sodium bisulfite
4 gal. water The product had excellent affinity for practically all classes of dyes. This pigment was incorporated into crystallizable polyethylene and melt spun to form fibers which were dyed with cellulose acetate, acid wool, and premetallized dyes with excellent results.

Example 26

Twenty grams of the pigment described in Example 24 was stirred with 400 cc. of acetone to give a fine, stable suspension. One hundred grams of crystallizable polyethylene (made as described in Angew. Chem. 67, 541–547 (1955), having a particle size passing through 200-mesh was slurried in the acetone-pigment suspension and the acetone was evaporated. The pigment was deposited on the surface of the polyethylene particles. Fibers were spun by extruding the melted polymer through a multi-hole spinneret. After drafting and heat-setting, the fibers had a tensile strength of 3.6 grams per denier and an elongation of 28%. They dyed readily with cellulose acetate, acid wool, and premetallized dyes.

Example 27

The pigment of Example 24 was incorporated in crystallizable polypropylene fibers by a process similar to that of Example 26. The fibers dyed well with cellulose acetate, acid wool, and premetallized dyes.

Example 28

Fifteen grams of the pigment described in Example 24 was milled with 100 grams of crystallizable polypropylene on heated rolls until a complete dispersion was obtained. Fibers were melt spun and drafted. They dyed well with cellulose acetate, acid wool, and premetallized dyes. Films were also extruded from the hot melt. Practically all classes of printing inks adhered well to the surface of these films.

Example 29

Twenty grams of the pigment described in Example 25 was stirred with 500 cc. of toluene to give a fine, stable suspension. One hundred grams of crystallizable polyethylene was dissolved in the tolene-pigment mixture by heating to 100° C. The resulting mixture was allowed to cool and the polyethylene was precipitated as fine crystals. These crystals contained the pigment as a fine dispersion. The polymer was filtered from the cold solvent and dried. The dry polymer was extruded into fibers and films from hot melts of the polymer. The fibers and films were readily dyed with cellulose acetate, acid wool, and premetallized dyes.

Example 30

Twenty grams of the pigment described in Example 24 was stirred with 500 cc. of acetone to give a fine dispersion. One hundred grams of crystallizable poly-4-methyl-pentene-1 was slurried in the acetone-pigment suspension and the acetone was evaporated. Fibers spun from the product by the melt method dyed well.

Example 31

Crystallizable polystyrene was used in place of polyethylene in Example 26 using the procedure described therein to obtain readily dyeable polystyrene fibers of excellent quality.

Example 32

Twenty grams of the pigment described in Example 24 was dispersed in 100 cc. of xylene. The dispersion was mixed with a solution of 100 grams of crystallizable polyethylene dissolved in 300 cc. of hot xylene. The mixture was allowed to cool and as the polyethylene separated from solution it carried the pigment down with it. The xylene was evaporated. The product was melt spun to give fibers with good dyeing properties.

A wide variety of methods can advantageously be employed to obtain dispersions of the organic pigment in the crystallizable polymeric hydrocarbon as indicated above as regards polyesters.

One method of obtaining such a dispersion is to slurry the powdered polymeric hydrocarbon in a liquid dispersion of the organic pigment. The slurry is then evaporated to dryness leaving the organic pigment attached to the particles of polymer. The powder composed of organic amide pigment and polymeric hydrocarbon can then be extruded into fibers or films which contain uniform dispersions of organic pigment. The amount of organic pigment may constitute any part of the final fiber or film. The preferred range is that the fiber or film be composed of 2–30% organic pigment. The fiber or film may be drafted or crystallized, then dyed or printed by various well known techniques.

Another means of dispersing the organic pigment in the polymeric hydrocarbon is to mill the organic pigment with the hydrocarbon polymer on hot rolls. In order to use this method the organic pigment can be prepared and dried to a powder. The powdered pigment can then be added in the desired amount to the polymeric hydrocarbon as it is being milled on the hot rolls and while it is in a molten state. The polymeric hydrocarbon which contains the dispersed pigment can then be extruded into fibers or films. These fibers and films can be dyed or printed by various well known methods.

Another method of dispersing the organic amide pigment in the polymeric, crystallizable hydrocarbon is to suspend the pigment in a solution of the polymer. The pigment can be suspended in an organic liquid which is non-solvent for polymer cold but which dissolves the polymer readily when hot. The polymer can then be dissolved in the hot mixture and when solution is complete the mixture is cooled. The polymeric hydrocarbon separates and carries with it the organic pigment as a fine dispersion in the particles of crystallizable polyhydrocarbon. The polymer is then filtered and dried. The amount of pigment which may be added to the polymer can be any desired part of the final product but the preferred range is 2–30% pigment based on the final weight of the polymer.

The dry polymer can be readily extruded into fibers or films which can be crystallized. The crystallized pigment-modified fibers and films can be readily dyed and printed.

In general, any fiber, film, or other shaped object made from crystallizable hydrocarbon polymers can be modified by the process of the invention to impart improved dyeing properties. Suitable types of crystallizable hydrocarbon polymers are described by Natta in Makromolecular Chemie 16, 213–237 (1955), and Angew. Chem. 68, 393 (1956). Crystallizable vinyl ether polymers also can be improved by the process.

Suitable dyes which can be employed in dyeing any of the pigmented polymers described herein include those set forth in the annual editions of the Technical Manual and Yearbook of the American Association of Textile Chemists and Colorists, e.g. the 1952 edition.

Although the invention has been described in considerable detail with reference to certain embodiments, it will be understood that variations and modifications can be effected without departing from the spirit and scope of the invention as described hereinabove and as defined in the appended claims.

We claim:

1. A melt spinning composition adapted for use in preparing readily dyeable oriented highly polymeric synthetic fibers by the melt spinning process, said composition comprising a uniform mixture of (A) a highly polymeric thermoplastic fiber-forming synthetic resin selected from the group consisting of (a) linear condensation polyesters of dicarboxy acids and glycols and (b) crystallizable polymers of α-mono-olefinic hydrocarbons containing from 2 to 8 carbon atoms, and (B) from about 2% to about 30% based on the weight of the fiber-forming synthetic resin of a polymeric pigment comprising a cross-linked high polymer of (1) at least 30% by weight of a monoethylenically unsaturated aliphatic amide selected from the group consisting of maleic amides, fumaric amides, itaconic amides, citraconic amides and acrylamides wherein the amino groups of all of these amides have the formula $-NR_2$ and the α-position of acrylamide contains an R substituent wherein each R represents a member selected from the group consisting of lower alkyl and hydroxyalkyl radicals containing from 1 to 6 carbon atoms and a hydrogen atom, and (2) from about 0.1% to about 20% by weight of a cross-linking agent selected from the group consisting of the divinyl and diallyl organic compounds containing from 5 to 20 carbon atoms, the pigment being characterized by (1) being infusible at temperatures used in melt spinning the fiber-forming polymer (2) being insoluble both in water and in the fiber-forming polymer at melt spinning temperature, and (3) having particle sizes of less than 10 microns.

2. A melt spinning composition as defined by claim 1 wherein the unsaturated aliphatic amide is N,N-dimethylacrylamide and the cross-linking agent is methylene-bis-acrylamide.

3. A melt spinning composition as defined by claim 1 wherein the unsaturated aliphatic amide is N-isopropylacrylamide and the cross-linking agent is methylene-bis-acrylamide.

4. A melt spinning composition as defined by claim 1 wherein the unsaturated aliphatic amide is α-methacrylamide and the cross-linking agent is diallyl phthalate.

5. A melt spinning composition as defined by claim 1 wherein the unsaturated aliphatic amide is N-tertiary-butylacrylamide and the cross-linking agent is methylene-bis-acrylamide.

6. A melt spinning composition as defined by claim 1 wherein the unsaturated aliphatic amide is N,N-dimethylacrylamide and the cross-linking agent is divinylbenzene.

7. A melt spinning composition as defined by claim 6 wherein the polymeric pigment is a copolymer of N,N-dimethylacrylamide, acrylonitrile and about 10 to 20% of the polymeric pigment of divinyl benzene.

8. A melt spinning composition as defined by claim 6 wherein the polymeric pigment is a copolymer of N,N-dimethylacrylamide, methyl methacrylate and about 5 to 15% by weight of the polymeric pigment of divinylbenzene.

9. A melt spinning composition as defined by claim 6 wherein the polymeric pigment is a copolymer of N,N-methylacrylamide, ethyl acrylate and about 10 to 20% by weight of the polymeric pigment of divinylbenzene.

10. A synthetic fiber melt-spun from the melt spinning composition defined by claim 1.

11. A melt spinning composition as defined by claim 1 wherein said fiber-forming synthetic resin is a polyester of terephthalic acid and ethylene glycol.

12. A synthetic fiber melt-spun from the melt spinning composition defined by claim 11.

13. A melt spinning composition as defined by claim 1 wherein said fiber-forming synthetic resin is a polyester of terephthalic acid and 1,4-cyclohexanedimethanol.

14. A synthetic fiber melt-spun from the melt spinning composition defined by claim 13.

15. A melt spinning composition as defined by claim 1 wherein said fiber-forming synthetic resin is polyethylene.

16. A synthetic fiber melt-spun from the melt spinning composition defined by claim 15.

17. A melt spinning composition as defined by claim 1 wherein said fiber-forming synthetic resin is polypropylene.

18. A synthetic fiber melt-spun from the melt spinning composition defined by claim 17.

19. A melt spinning composition as defined by claim 1 wherein said fiber-forming synthetic resin is polystyrene.

20. A synthetic fiber melt-spun from the melt spinning composition defined by claim 19.

References Cited in the file of this patent

UNITED STATES PATENTS

| | | |
|---|---|---|
| 2,719,138 | Hagemeyer et al. | Sept. 27, 1955 |
| 2,776,271 | Coover et al. | Jan. 1, 1957 |

FOREIGN PATENTS

| | | |
|---|---|---|
| 610,140 | Great Britain | Oct. 12, 1948 |

UNITED STATES PATENT OFFICE
CERTIFICATE OF CORRECTION

Patent No. 2,893,970                                                    July 7, 1959

John R. Caldwell et al.

It is hereby certified that error appears in the printed specification of the above numbered patent requiring correction and that the said Letters Patent should read as corrected below.

Column 1, line 53, for "described" read -- describes --; column 10, lines 23 and 37, for "mxed", each occurrence, read -- mixed --; column 14, line 58, for "tolene" read -- toluene --; column 16, line 67, for "methylacrylamide" read -- dimethylacrylamide --.

Signed and sealed this 16th day of February 1960.

(SEAL)
Attest:

KARL H. AXLINE                                         ROBERT C. WATSON
Attesting Officer                                     Commissioner of Patents